(12) United States Patent
Hetsko et al.

(10) Patent No.: US 12,455,578 B1
(45) Date of Patent: Oct. 28, 2025

(54) ANOMALOUS ENTITY DETECTION IN A COOPERATIVE SWARM OF UNCREWED VEHICLES

(71) Applicant: CAES Systems LLC, Arlington, VA (US)

(72) Inventors: Brian Adam Hetsko, Lancaster, PA (US); Brent Franklin Davis, Windsor, PA (US); Darrell Ray Snader, Manheim, PA (US)

(73) Assignee: CAES Systems LLC, Arlington, VA (US)

( * ) Notice: Subject to any disclaimer, the term of this patent is extended or adjusted under 35 U.S.C. 154(b) by 155 days.

(21) Appl. No.: 18/523,410

(22) Filed: Nov. 29, 2023

Related U.S. Application Data (60) Provisional application No. 63/483,999, filed on Feb. 9, 2023.

(51) Int. Cl.
| | | |
|---|---|---|
| *G05D 1/86* | (2024.01) |
| *G01S 13/08* | (2006.01) |
| *G01S 13/89* | (2006.01) |
| *G05D 1/69* | (2024.01) |
| *G05D 109/20* | (2024.01) |
| *G05D 111/30* | (2024.01) |

(52) U.S. Cl.
CPC ............... *G05D 1/86* (2024.01); *G01S 13/08* (2013.01); *G01S 13/89* (2013.01); *G05D 1/69* (2024.01); *G05D 2109/20* (2024.01); *G05D 2111/30* (2024.01)

(58) Field of Classification Search
CPC ........ G05D 1/86; G05D 1/69; G05D 2111/30; G05D 2109/20; G01S 13/08; G01S 13/39
See application file for complete search history.

(56) References Cited

U.S. PATENT DOCUMENTS

| | | | |
|---|---|---|---|
| 8,756,004 B2* | 6/2014 | Chou ................. | G01C 21/3623 701/428 |
| 2006/0149464 A1* | 7/2006 | Chien ................ | G01C 21/3492 340/995.19 |
| 2011/0054731 A1* | 3/2011 | DeRose ................ | G06Q 10/08 701/31.4 |
| 2022/0187841 A1* | 6/2022 | Ebrahimi Afrouzi .. | G01C 21/12 |

* cited by examiner

*Primary Examiner* — Tan Q Nguyen
(74) *Attorney, Agent, or Firm* — Alston & Bird LLP (57) ABSTRACT

Systems, cooperative uncrewed vehicles, and methods for detecting an uncooperative uncrewed vehicle within a plurality of cooperative uncrewed vehicles are provided. For example, a system may include a plurality of cooperative uncrewed vehicles. Each cooperative vehicle is configured to transmit a respective first RF signal containing a unique ID code, receive reflections of the first RF signal reflected off other cooperative vehicles and at least one uncooperative vehicle, calculate a distance at which the first RF signal was reflected, create one or more point clouds corresponding to the reflections of the first RF signal; determine distances to each of the cooperative vehicles, and correlate the point clouds with distances to each of the cooperative vehicles to determine which of the point clouds is associated with which of the cooperative vehicles and therefore which point cloud is associated with the uncooperative vehicle.

18 Claims, 8 Drawing Sheets

ANOMALOUS ENTITY DETECTION IN A COOPERATIVE SWARM OF UNCREWED VEHICLES

CROSS-REFERENCE TO RELATED APPLICATIONS

This application claims priority to and the benefit of U.S. Provisional Patent Application Ser. No. 63/483,999, filed on Feb. 9, 2023, and entitled "Method for Anomalous Entity Detection in a Cooperative Swarm of Uncrewed Vehicles," which is incorporated herein by reference in its entirety.

TECHNOLOGICAL FIELD

Example embodiments of the present disclosure relate generally to uncrewed vehicles and, more particularly, to detecting an uncooperative uncrewed vehicle within a plurality of cooperative uncrewed vehicles.

BACKGROUND

Uncrewed vehicles, such as uncrewed aerial vehicles (UAVs) (also commonly referred to as "unmanned aerial vehicles" or "drones") are being increasingly used for military operations, both offensively and defensively. Such UAVs may be used, for example, to carry and deliver explosives to a target. Detecting and identifying such potentially harmful UAVs is important in many military and non-military environments and applications.

Applicant has discovered problems with current implementations of UAV detection and identification. Through applied effort, ingenuity, and innovation, many of these identified problems have been solved by developing solutions that are included in embodiments of the present disclosure, many examples of which are described in detail herein.

BRIEF SUMMARY

In general, embodiments of the present disclosure described herein provide improvements in detecting an uncooperative uncrewed vehicle within a plurality of cooperative uncrewed vehicles. Other implementations for detecting an uncooperative uncrewed vehicle within a plurality of cooperative uncrewed vehicles will be, or will become, apparent to one with skill in the art upon examination of the following figures and detailed description. It is intended that all such additional implementations be included within this description be within the scope of the disclosure and be protected by the following claims.

In accordance with a first aspect of the disclosure, a system of detecting an uncooperative uncrewed vehicle within a plurality of cooperative uncrewed vehicles is provided. In at least one example embodiment, an example system includes a plurality of cooperative uncrewed vehicles, each vehicle comprising one or more radio frequency (RF) transmitters, one or more RF receivers, and a processor. Each of the plurality of cooperative uncrewed vehicles is configured to transmit, via at least one of the one or more RF transmitters, a respective first RF signal containing a unique identification (ID) code; receive, via at least one of the one or more RF receivers, a plurality of reflections of the first RF signal reflected off one or more others of the plurality of cooperative uncrewed vehicles and reflected off at least one uncooperative uncrewed vehicle; calculate, via the processor, for at least some of the plurality of reflections, a distance at which the first RF signal was reflected based on an amount of time between the transmission of the first RF signal and the receiving of each of the plurality of reflections; create, via the processor, one or more point clouds, each point cloud corresponding to the reflections of the first RF signal reflected off one of the others of the plurality of cooperative uncrewed vehicles or off the at least one uncooperative uncrewed vehicle; receive, via at least one of the one or more RF receivers, (i) respective first RF signals from one or more others of the plurality of cooperative uncrewed vehicles, each of the respective first RF signals containing a unique ID code and a location of a respective one of the one or more others of the plurality of cooperative uncrewed vehicles, or (ii) respective second RF signals from one or more others of the plurality of cooperative uncrewed vehicles, each of the respective second RF signals sent by a respective one of the one or more others of the plurality of cooperative uncrewed vehicles in response to receiving the first RF signal and each of the respective second RF signals having a delay; correlate, via the processor, the created point clouds with (i) the received respective first RF signals from each of the one or more others of the plurality of cooperative uncrewed vehicles or (ii) the received respective second RF signals from each of one or more others of the plurality of cooperative uncrewed vehicles to determine which of the one or more point clouds is associated with which one of the one or more others of the plurality of cooperative uncrewed vehicles; and determine, via the processor, which of the one or more point clouds is not associated with one of the one or more others of the plurality of cooperative uncrewed vehicles and is therefore associated with one of the at least one uncooperative uncrewed vehicle.

In some embodiments, the first RF signal transmitted by each of the plurality of cooperative uncrewed vehicles contains a location of the respective one of the plurality of cooperative uncrewed vehicles.

In some embodiments, each of the plurality of cooperative uncrewed vehicles is further configured to, via the processor, use the delay of the received respective second RF signals from each of one or more others of the plurality of cooperative uncrewed vehicles to determine a range to each of one or more others of the plurality of cooperative uncrewed vehicles.

In some embodiments, each of the plurality of cooperative uncrewed vehicles is further configured to transmit, via at least one or the one or more RF transmitters, its determination of which of the one or more point clouds is associated with which one of the one or more others of the plurality of cooperative uncrewed vehicles.

In some embodiments, each of the plurality of cooperative uncrewed vehicles is further configured to receive, from one or more others of the plurality of cooperative uncrewed vehicles via at least one of the one or more RF receivers, one or more determinations of which of the one or more point clouds is associated with which one of the one or more others of the plurality of cooperative uncrewed vehicles.

In some embodiments, each of the plurality of cooperative uncrewed vehicles and the at least one uncooperative uncrewed vehicle comprise uncrewed aerial vehicles.

In accordance with another aspect of the disclosure, an uncrewed vehicle for detecting an uncooperative uncrewed vehicle within a plurality of cooperative uncrewed vehicles is provided. In some embodiments, an example vehicle comprises a radio frequency (RF) transmitter configured to transmit a first RF signal containing a unique identification (ID) code, one or more RF receivers configured to receive a plurality of reflections of the first RF signal reflected off one or more others of the plurality of cooperative uncrewed vehicles and reflected off at least one uncooperative uncrewed vehicle, and a processor configured to calculate, for at least some of the plurality of reflections, a distance at which the first RF signal was reflected based on an amount of time between the transmission of the first RF signal and the receiving of each of the plurality of reflections and configured to create one or more point clouds, each point cloud corresponding to the reflections of the first RF signal reflected off one of the others of the plurality of cooperative uncrewed vehicles or off the at least one uncooperative uncrewed vehicle. At least one of the one or more RF receivers is adapted to receive (i) respective first RF signals from one or more others of the plurality of cooperative uncrewed vehicles, each of the respective first RF signals containing a location of a respective one of the one or more others of the plurality of cooperative uncrewed vehicles, or (ii) respective second RF signals from one or more others of the plurality of cooperative uncrewed vehicles, each of the respective second RF signals sent by a respective one of the one or more others of the plurality of cooperative uncrewed vehicles in response to receiving the first RF signal and each of the respective second RF signals having a delay. The processor is configured to correlate the created point clouds with (i) the received respective first RF signals from each of the one or more others of the plurality of cooperative uncrewed vehicles or (ii) the received respective second RF signals from each of one or more others of the plurality of cooperative uncrewed vehicles to determine which of the one or more point clouds is associated with which one of the one or more others of the plurality of cooperative uncrewed vehicles. The processor is configured to determine which of the one or more point clouds is not associated with one of the one or more others of the plurality of cooperative uncrewed vehicles and is therefore associated with one of the at least one uncooperative uncrewed vehicle.

In accordance with another aspect of the disclosure, a method of detecting an uncooperative uncrewed vehicle within a plurality of cooperative uncrewed vehicles is provided. In some embodiments, the method comprises transmitting, by each of a plurality of cooperative uncrewed vehicles via a respective radio frequency (RF) transmitter, a respective first RF signal containing a unique identification (ID) code; receiving, by each of the plurality of cooperative uncrewed vehicles via at least one of a respective one or more RF receivers, a plurality of reflections of the first RF signal reflected off one or more others of the plurality of cooperative uncrewed vehicles and reflected off at least one uncooperative uncrewed vehicle; calculating, by each of the plurality of cooperative uncrewed vehicles via a respective processor for at least some of the plurality of reflections, a distance at which the first RF signal was reflected based on an amount of time between the transmission of the first RF signal and the receiving of each of the plurality of reflections; creating, by each of the plurality of cooperative uncrewed vehicles via its respective processor, one or more point clouds, each point cloud corresponding to the reflections of the first RF signal reflected off one of the others of the plurality of cooperative uncrewed vehicles or off the at least one uncooperative uncrewed vehicle; receiving, by each of the plurality of cooperative uncrewed vehicles via at least one of its respective one or more RF receivers, (i) respective first RF signals from one or more others of the plurality of cooperative uncrewed vehicles, each of the respective first RF signals containing a unique ID code and a location of a respective one of the one or more others of the plurality of cooperative uncrewed vehicles, or (ii) respective second RF signals from one or more others of the plurality of cooperative uncrewed vehicles, each of the respective second RF signals sent by a respective one of the one or more others of the plurality of cooperative uncrewed vehicles in response to receiving the first RF signal and each of the respective second RF signals having a delay; correlating, by each of the plurality of cooperative uncrewed vehicles via its respective processor, the created point clouds with (i) the received respective first RF signals from each of the one or more others of the plurality of cooperative uncrewed vehicles or (ii) the received respective second RF signals from each of one or more others of the plurality of cooperative uncrewed vehicles to determine which of the one or more point clouds is associated with which one of the one or more others of the plurality of cooperative uncrewed vehicles; and determining, by each of the plurality of cooperative uncrewed vehicles via its respective processor, which of the one or more point clouds is not associated with one of the one or more others of the plurality of cooperative uncrewed vehicles and is therefore associated with one of the at least one uncooperative uncrewed vehicle.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

Having thus described the embodiments of the disclosure in general terms, reference now will be made to the accompanying drawings, which are not necessarily drawn to scale, and wherein:

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," "bottom," "left," "right," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The phrases "in one example," "according to one example," "in some examples," and the like generally mean that the particular feature, structure, or characteristic following the phrase may be included in at least one example of the present disclosure and may be included in more than one example of the present disclosure (importantly, such phrases do not necessarily refer to the same example).

If the specification states a component or feature "may," "can," "could," "should," "would," "preferably," "possibly," "typically," "optionally," "for example," "as an example," "in some examples," "often," or "might" (or other such language) be included or have a characteristic, that specific component or feature is not required to be included or to have the characteristic. Such component or feature may be optionally included in some examples, or it may be excluded.

The word "example" or "exemplary" is used herein to mean "serving as an example, instance, or illustration." Any implementation described herein as "example" or "exemplary" is not necessarily to be construed as preferred or advantageous over other implementations.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

The term "component" may refer to an article, a device, or an apparatus that may comprise one or more surfaces, portions, layers and/or elements. For example, an example component may comprise one or more substrates that may provide underlying layer(s) for the component and may comprise one or more elements that may form part of and/or are disposed on top of the substrate. In the present disclosure, the term "element" may refer to an article, a device, or an apparatus that may provide one or more functionalities.

Embodiments of the present disclosure provide systems, uncrewed vehicles, and methods for detecting an uncooperative uncrewed vehicle within a plurality of cooperative uncrewed vehicles. While embodiments of the present disclosure are described herein in terms of uncrewed aerial vehicles (UAVs), embodiments of the present disclosure also apply to other types of uncrewed or unmanned vehicles, such as uncrewed land vehicles and uncrewed water vehicles.

As described herein, the terms "cooperative uncrewed vehicle" and "cooperative UAV" refer to a UAV that operates in conjunction with other UAVs to accomplish the functionality described herein. Such cooperative uncrewed vehicles operate in a group of cooperative uncrewed vehicles. Such a group of cooperative uncrewed vehicles may be termed a "swarm." As described herein, the terms "uncooperative uncrewed vehicle" and "uncooperative UAV" refer to a UAV that is not part of the group of UAVs operating in conjunction to accomplish the functionality described herein. Such an uncooperative uncrewed vehicle may be, for example, a hostile UAV or a malfunctioning cooperative uncrewed vehicle that is no longer capable of communicating with the other UAVs in the swarm.

The systems, UAVs, and methods of embodiments of the present disclosure provide a defensive detection network for identifying one or more uncooperative UAVs flying near or over an area to be protected. Such protected areas may include, but are not limited to, military installations such as military bases and civilian installations such as power plants.

Embodiments of the present disclosure provide such a defensive detection network by operating a plurality of cooperative UAVs (i.e., a swarm) over and/or near a protected area. In various embodiments, each of the cooperative UAVs detects other objects flying nearby and identifies which of those detected objects are other cooperative UAVs. In various embodiments, any objects that are not identified as cooperative UAVs are indicated to be uncooperative UAVs.

In various embodiments, the swarm of cooperative UAVs may include any suitable number of cooperative UAVs. Generally, a greater number of cooperative UAVs operating together provides more accuracy and greater protection. Generally, larger areas to be protected require a greater number of cooperative UAVs operating together to provide a desired level of protection. In various embodiments, a sufficient number of cooperative UAVs is provided to have a spacing between UAVs of about 30 to about 100 meters. In various embodiments, at least three cooperative UAVs need to be in range of an uncooperative UAV to resolve the location of the uncooperative UAV in two dimensions, while at least four cooperative UAVs need to be in range of an uncooperative UAV to resolve the location of the uncooperative UAV in three dimensions. In various embodiments, the range of communication, detection, and discrimination are dependent upon the RF implementation features which determine link margin to their respective communication neighbors including, but not limited to channel count, transmit power, RF sensitivity, processing gain, antenna directionality, etc.

In various embodiments, any suitable type of UAV may be used, including, but not limited to, single rotor, multirotor, or fixed wing. In various embodiments, any suitable size of UAV may be used, including, but not limited to Group 1 (small), Group 2 (medium), or micro-copters.

In various embodiments, the swarm of cooperative UAVs operate independently once launched. That is, the cooperative UAVs are typically not controlled by a user via a controller during flight. In various embodiments, each cooperative UAV in a swarm of cooperative UAVs may fly a predetermined pattern (e.g., circle, oval, FIG. 8) or may fly randomly within preestablished boundaries.

In various embodiments, each cooperative UAV in a swarm of cooperative UAVs is able to determine its location in real time using any suitable location determination mechanism, including, but not limited to global positioning system (GPS) and/or dead reckoning.

In various embodiments, the swarm of cooperative UAVs operate in a passive, asynchronous mode or an active, synchronous mode, described further below. In various embodiments, each cooperative UAV in a swarm of cooperative UAVs transmits a first RF signal with a unique ID code (e.g., numeric or alphanumeric) encoded on the first RF signal. In various embodiments, any suitable RF technology, protocol, communications band(s), encoding algorithm, etc., may be used for the RF communications described herein. In various embodiments, each cooperative UAV in a swarm of cooperative UAVs transmits the first RF signal repeatedly, such as every once every millisecond. In various embodiments, the first RF signal may be transmitted repeatedly at any suitable frequency and/or interval. In various embodiments, each cooperative UAV in a swarm of cooperative UAVs has any suitable number and type of antenna for RF transmission and reception. For example, in various embodiments each cooperative UAV has four antennas positioned at 90 degrees around the cooperative UAV. In another example, in various embodiments each cooperative UAV has a single omnidirectional antenna. In various embodiments, the same antenna(s) is/are used for transmitting and for receiving. In various embodiments, the first RF signal is transmitted via wideband RF signaling with sufficient bandwidth to resolve the radar cross section of a typical small UAV at ranges relevant to various embodiments of the disclosure.

In various embodiments, in the asynchronous mode the first RF signal transmitted by each cooperative UAV includes the respective UAV's location. In various embodiments, in the synchronous mode the first RF signal transmitted by each cooperative UAV does not include the respective UAV's location. Rather, in the synchronous mode each cooperative UAV in a swarm of cooperative UAVs transmits its respective location in a second RF signal that is transmitted after a first RF signal is received from one or more of the cooperative UAVs.

In various embodiments, each cooperative UAV in a swarm of cooperative UAVs receives reflections of the first RF signal off one or more cooperative UAV and one or more uncooperative UAV. In various embodiments, each cooperative UAV in a swarm of cooperative UAVs, using conventional radar techniques, calculates the distance to each object (cooperative UAV or uncooperative UAV) off which the first RF signal reflected. In various embodiments, each cooperative UAV in a swarm of cooperative UAVs uses these calculated distances to create one or more point clouds representing the various distances of the different reflections. In various embodiments, a point cloud is essentially a set of otherwise associated data points in 3-dimensional space, in either a relative or absolute coordinate system.

In various embodiments, each cooperative UAV in a swarm of cooperative UAVs correlates its created point clouds with the known location(s) of the other cooperative UAV(s) to associate one or more of the point clouds with one or more corresponding cooperative UAVs. In various embodiments, by determining which of the one or more point clouds is associated with one or more of the other cooperative UAVs, the point clouds that are not associated with one or more of the other cooperative UAVs can be assumed to be associated with one or more uncooperative UAVs. In this regard, the approximate location(s) of one or more uncooperative UAVs can be determined. In various embodiments, the point clouds are correlated with the known location(s) of the other cooperative UAV(s) statistically or heuristically.

In various embodiments, each cooperative UAV in a swarm of cooperative UAVs shares its determination of which of its point clouds may be associated with one or more of the other cooperative UAVs and which of its point clouds are associated with one or more uncooperative UAVs. In various embodiments, the receiving cooperative UAV correlates the received data with its own determined data and algorithmically determines that both UAVs have identified an unknown entity at nearly the same relative location.

Figure 1:
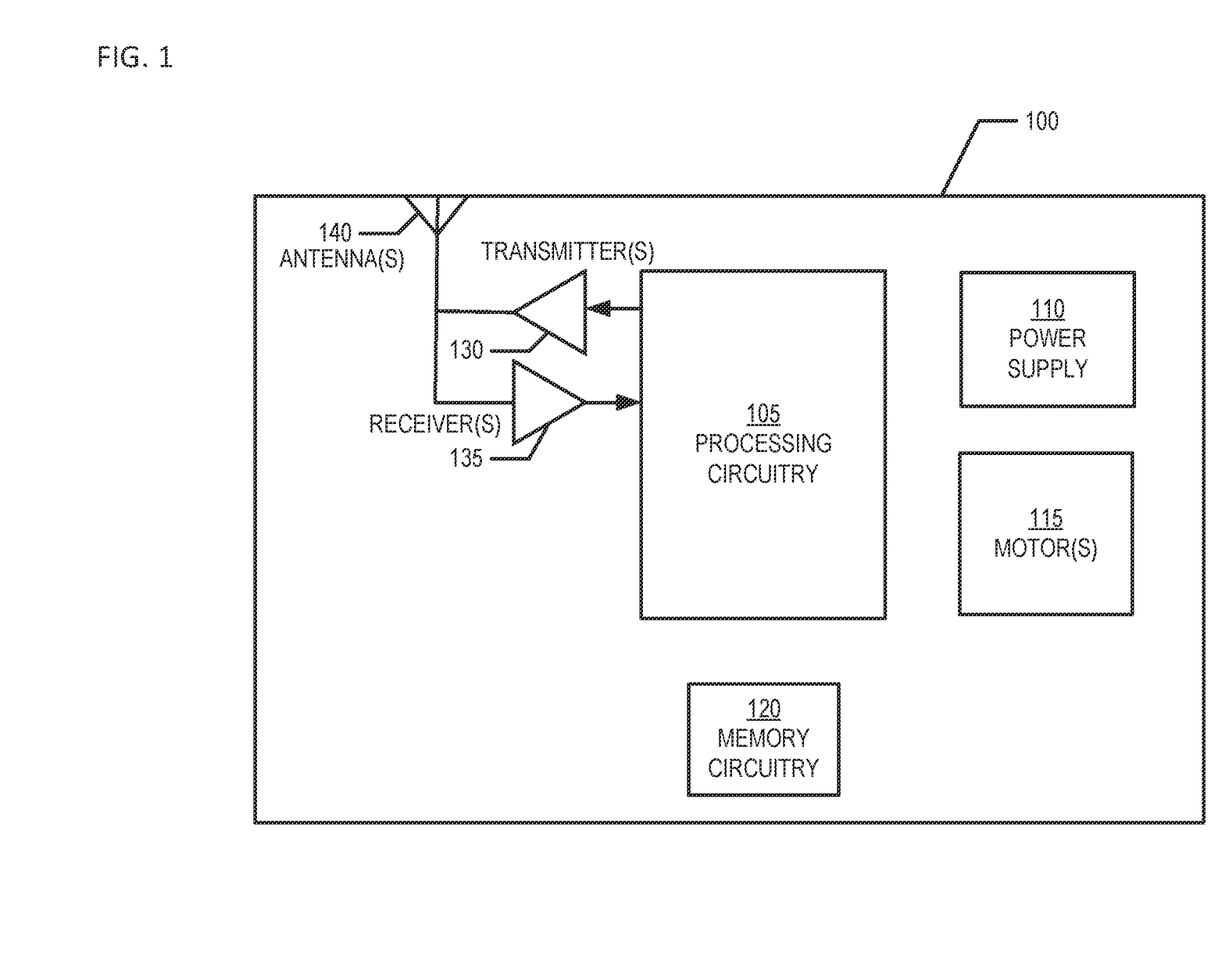
FIG. 1 illustrates a block diagram of an example uncrewed aerial vehicle (UAV) within which embodiments of the present disclosure may operate, in accordance with at least some example embodiments of the present disclosure.

Referring now to the figures, FIG. 1 is an example block diagram of an example cooperative UAV 100 in accordance with example embodiments of the present disclosure. As described above, the example cooperative UAV 100 is used for detecting an uncooperative uncrewed vehicle within a plurality of cooperative uncrewed vehicles. In the illustrated embodiment, the cooperative UAV 100 comprises processing circuitry 105, a power supply 110, one or more motors 115, memory circuitry 120, one or more transmitters 130, one or more receivers 135, and one or more antennas 140.

In an example embodiment, the processing circuitry 105 controls the operation of the cooperative UAV 100 and its various components, typically according to configuration data and instructional programming stored in the memory circuitry 120. In some embodiments, the processing circuitry 105 (and/or co-processor or any other processing circuitry assisting or otherwise associated with the processor) may be in communication with the memory circuitry 120 via a bus for passing information among components of the apparatus. The processing circuitry 105 may be embodied in a number of different ways and may, for example, include one or more processing devices configured to perform independently. Additionally, or alternatively, the processing circuitry 105 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

For example, the processing circuitry 105 may be embodied as one or more complex programmable logic devices (CPLDs), microprocessors, multi-core processors, co-processing entities, application-specific instruction-set processors (ASIPs), and/or controllers. Further, the processing circuitry 105 may be embodied as one or more other processing devices or circuitry. The term circuitry may refer to an entirely hardware embodiment or a combination of hardware and computer program products. Thus, the processing circuitry 105 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing circuitry 105 may be configured for a particular use or configured to execute instructions stored in volatile or non-volatile media or otherwise accessible to the processing circuitry 105. As such, whether configured by hardware or computer program products, or by a combination thereof, the processing circuitry 105 may be capable of performing steps or operations according to embodiments of the present disclosure when configured accordingly.

In an example embodiment, the processing circuitry 105 may be configured to execute instructions stored in the memory circuitry 120 or otherwise accessible to the processor. Alternatively, or additionally, the processing circuitry

105 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processing circuitry 105 is embodied as an executor of software instructions, the instructions may specifically configure the processor to perform the algorithms and/or operations described herein when the instructions are executed.

In some embodiments, the memory circuitry 120 may further include or be in communication with volatile media (also referred to as volatile storage, memory, memory storage, memory circuitry and/or similar terms used herein interchangeably). In some embodiments, the volatile storage or memory may also include, such as but not limited to, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the memory circuitry 120 may be used to store at least portions of the databases, database instances, database management system entities, data, applications, programs, program modules, scripts, source code, object code, byte code, compiled code, interpreted code, machine code, executable instructions, and/or the like being executed by, for example, the processing circuitry 105. Thus, the databases, database instances, database management system entities, data, applications, programs, program modules, scripts, source code, object code, byte code, compiled code, interpreted code, machine code, executable instructions, and/or the like may be used to control certain aspects of the operation of the cooperative UAV 100 with the assistance of the processing circuitry 105 and operating system.

In some embodiments, the memory circuitry 120 may further include or be in communication with non-volatile media (also referred to as non-volatile storage, memory, memory storage, memory circuitry and/or similar terms used herein interchangeably). In some embodiments, the memory circuitry 120 may include, such as, but not limited to, hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the memory circuitry 120 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

In various embodiments of the present disclosure, the memory circuitry 120 may also be embodied as a data storage device or devices, as a separate database server or servers, or as a combination of data storage devices and separate database servers. Further, in some embodiments, memory circuitry 120 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery system may be stored. Further, the information/data required for the operation of the recovery system may also be partially stored in the cloud data storage system and partially stored in a locally maintained data storage system. More specifically, memory circuitry 120 may encompass one or more data stores configured to store information/data usable in certain embodiments.

In an example embodiment, the power supply 110 provides electrical power to the various components of the cooperative UAV 100. In various embodiments, the power supply 110 may comprise any suitable power supply, such as but not limited to rechargeable lithium ion batteries or battery pack(s).

In an example embodiment, the motors 115 comprise one or more motors to rotate the one or more rotors or propellors. In an example embodiment in which the cooperative UAV is a quadcopter, there are four motors that each rotate a respective rotor. In various embodiments, the motors may comprise any suitable type and number of motors.

In an example embodiment, the transmitter 130 is any suitable one or more RF transmitters for transmitting the RF signals described herein. In an example embodiment, the receiver 135 is any suitable one or more RF receivers for receiving the RF signals described herein. In an example embodiment, the antenna(s) is/are any suitable antenna(s) for transmitting and receiving the RF signals described herein. In various embodiments, any suitable number, type, and position of antennas may be used.

The use of the term "circuitry" as used herein with respect to components of the apparatus should therefore be understood to include particular hardware configured to perform the functions associated with the particular circuitry as described herein. The term "circuitry" should be understood broadly to include hardware and, in some embodiments, software for configuring the hardware.

Having described example systems and apparatuses associated with embodiments of the present disclosure, example flowcharts including various operations performed by the apparatuses and/or systems described herein will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sub-process of a second process. Additionally or alternative, any of the processes may include some or all of the steps described and/or depicted, including one or more optional operational blocks in some embodiments. In regard to the below flowcharts, one or more of the depicted blocks may be optional in some, or all, embodiments of the disclosure. Similarly, it should be appreciated that one or more of the operations of each flowchart may be combinable, replaceable, and/or otherwise altered as described herein.

Figure 2:
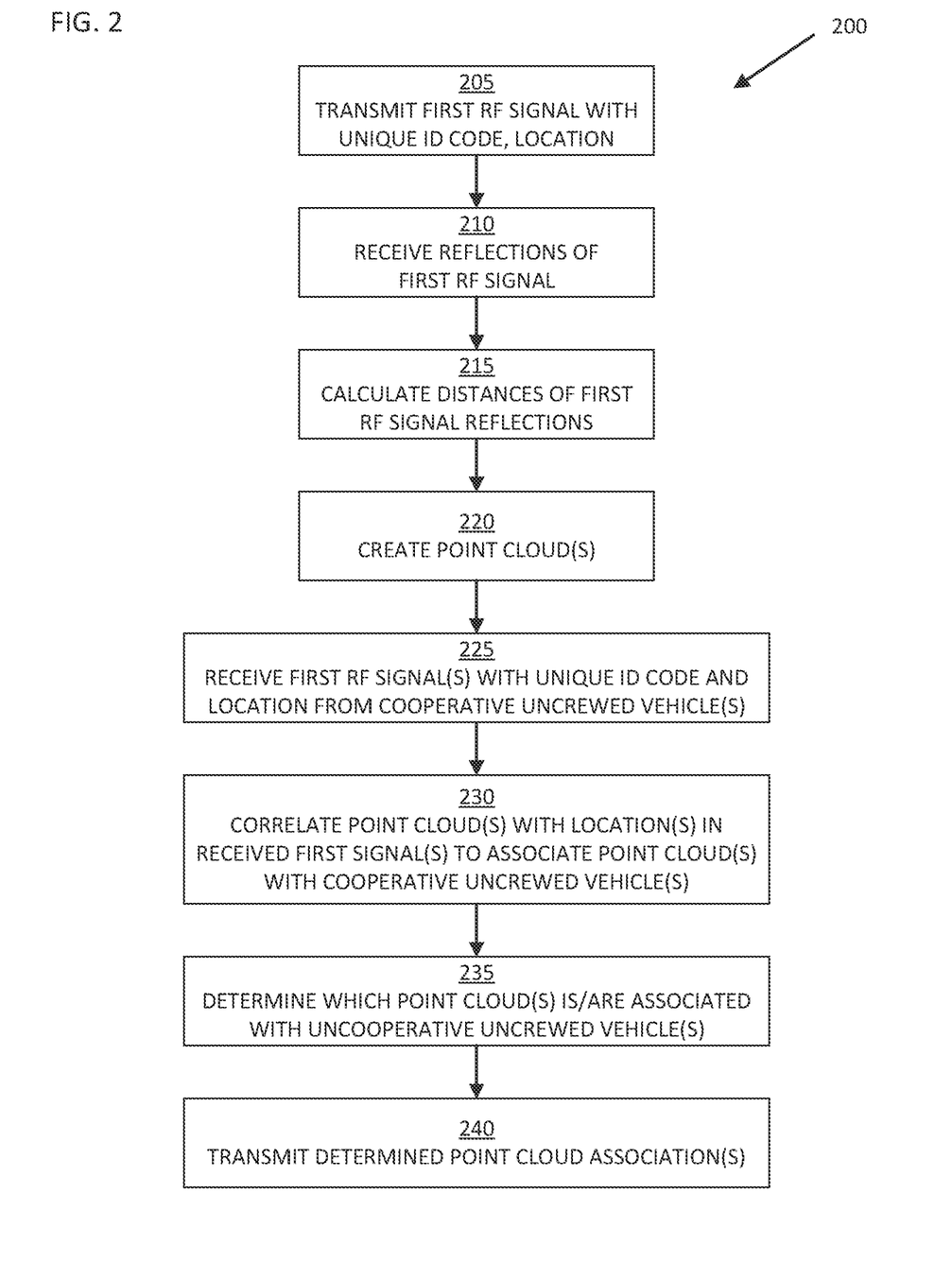
FIG. 2 illustrates a flowchart including operational blocks of an example process for detecting an uncooperative uncrewed vehicle within a plurality of cooperative uncrewed vehicles, in accordance with at least some example embodiments of the present disclosure.
Figure 3:
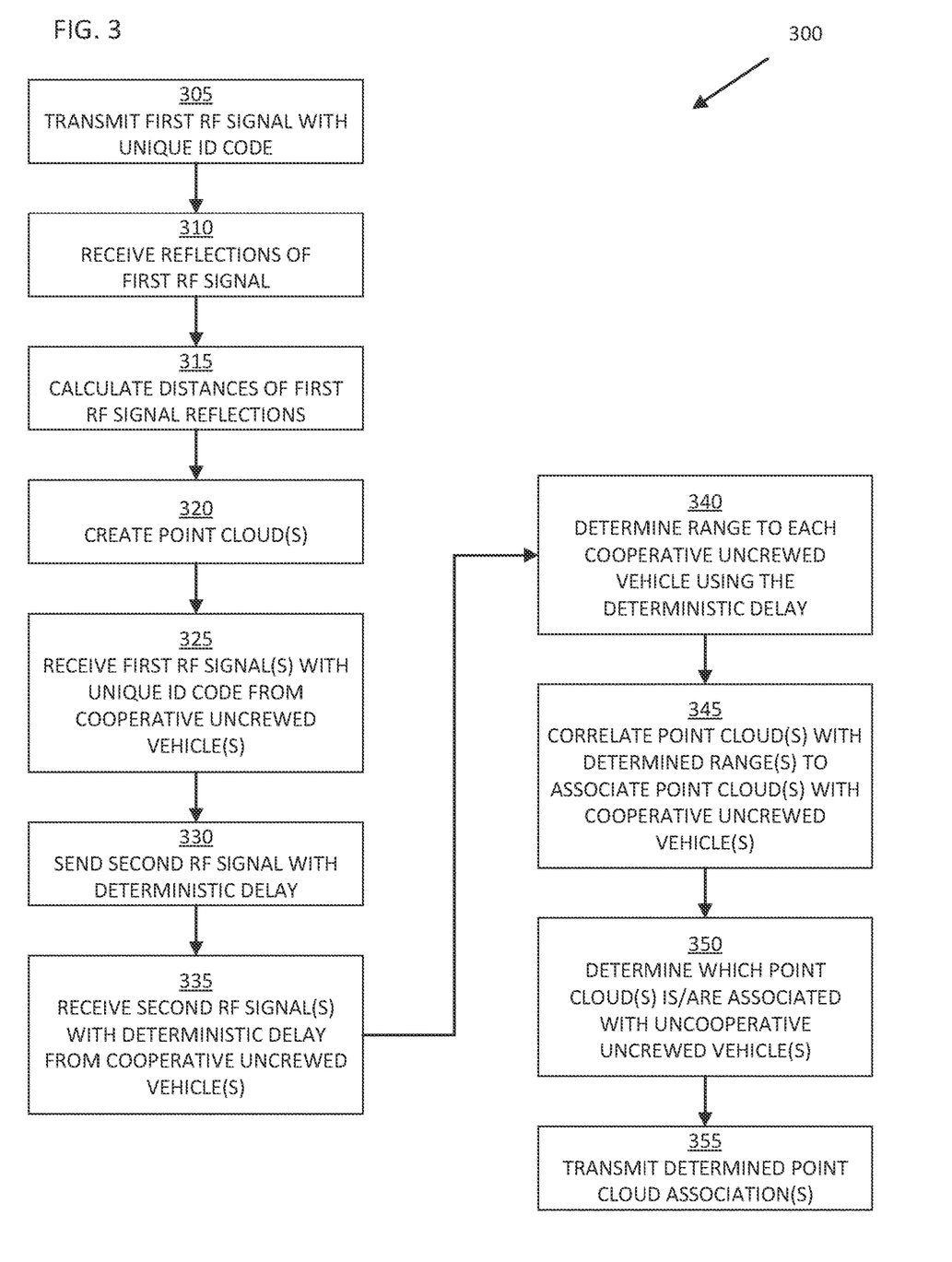
FIG. 3 illustrates a flowchart including operational blocks of an example process for detecting an uncooperative uncrewed vehicle within a plurality of cooperative uncrewed vehicles, in accordance with at least some alternative example embodiments of the present disclosure.

FIGS. 2 and 3 illustrate flowcharts including operational blocks of example processes for detecting an uncooperative uncrewed vehicle within a plurality of cooperative uncrewed vehicles. FIG. 2 illustrates such an example process in an asynchronous or passive mode, while FIG. 3 illustrates such an example process in synchronous or active mode. In various embodiments, each cooperative UAV in a swarm performs the example method of FIG. 2. In various other embodiments, each cooperative UAV in a swarm performs the example method of FIG. 3. FIGS. 4A-4E illustrate a swarm 400 of cooperative UAVs 405A-405H and one uncooperative UAV 460 (the dashed line circle around UAV 460 indicates that UAV 460 is uncooperative) and will be used to further illustrate the example methods of FIGS. 2 and 3.

Figure 4A:
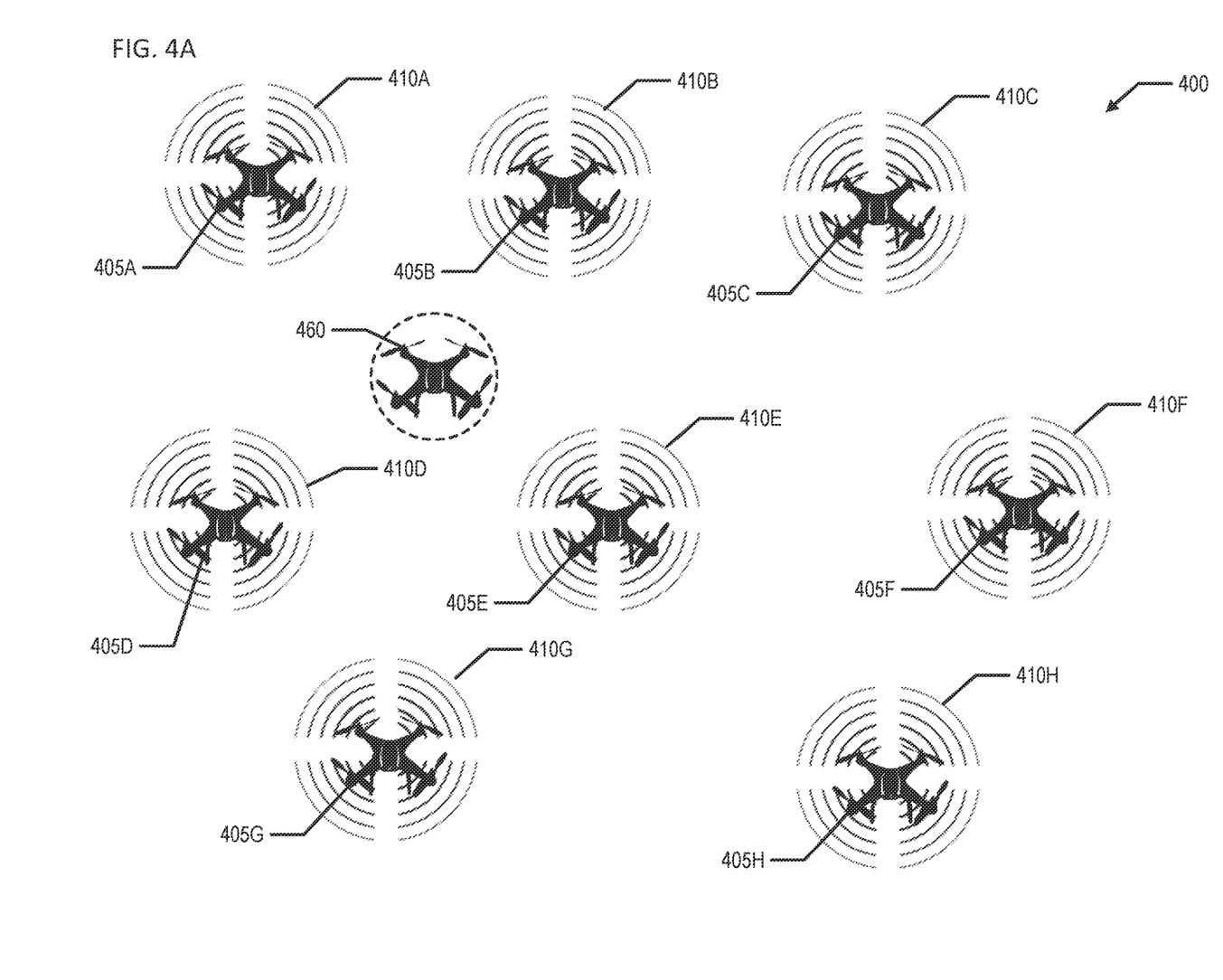
FIGS. 4A-4E illustrate diagrams of a plurality of cooperative uncrewed vehicles and an uncooperative uncrewed vehicle to illustrate a process for detecting an uncooperative uncrewed vehicle within a plurality of cooperative uncrewed vehicles, in accordance with at least some example embodiments of the present disclosure.

Referring now to FIG. 2, the example asynchronous or passive mode method 200 starts at step/operation 205. At step/operation 205, a processor (such as, but not limited to, the processing circuitry 105 of the cooperative UAV 100 described above in connection with FIG. 1, along with the transmitter 130 and the antenna 140) transmits a first radio frequency (RF) signal with a unique identification (ID) code (e.g., numeric or alphanumeric) and the UAV's location encoded on the first RF signal. In various embodiments, the signal coding also includes a time base, pseudo-noise (PN) code, or the like such that reflections can be properly associated by the receiver (e.g., to enable discernment of a reflection from something further away from an earlier pulse from a reflection of something closer from a more recent transmission). As seen in FIG. 4A, each of the cooperative UAVs 405A-405H of the swarm 400 is transmitting such a first RF signal 410A-410H, respectively, with respective ID codes and locations. In FIGS. 4A-4E, each of the first RF signals 410A-410H is shown as four separate signals, indicating that these cooperative UAVs each have four antennas spaced at 90 degrees in this example embodiment.

Figure 4B:
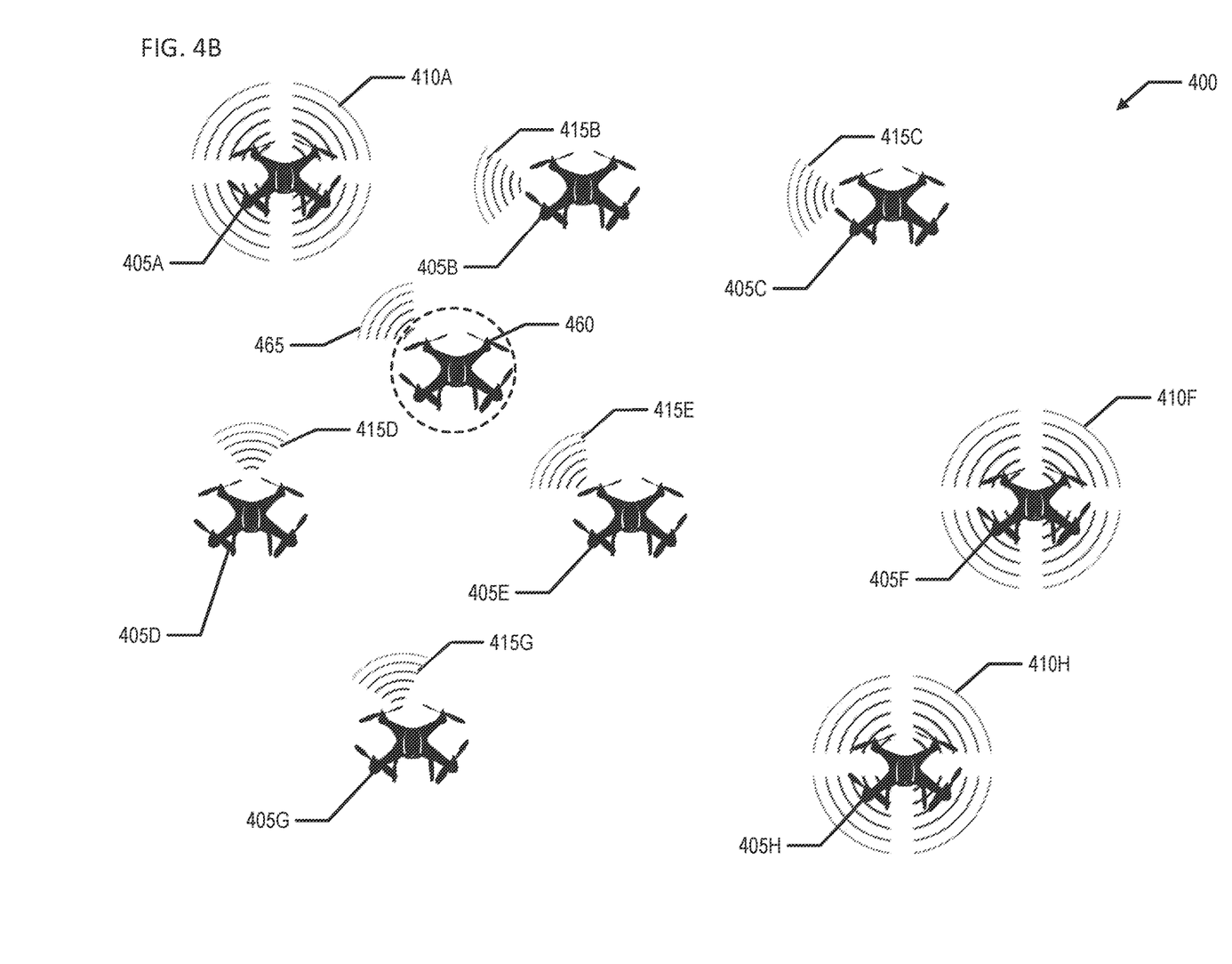

Returning now to FIG. 2, at step/operation 210, a processor (such as, but not limited to, the processing circuitry 105 of the cooperative UAV 100 described above in connection with FIG. 1, along with the receiver 135 and the antenna 140) receives reflections of the first RF signal off one or more cooperative UAVs and one or more uncooperative UAVs. FIG. 4B illustrates the reflections 415B, 415C, 415D, 415E, 415G, 465 of the first RF signal from UAV 405A reflecting off of, respectively, cooperative UAVs 405B, 405C, 405D, 405E, 405G, and uncooperative UAV 460. The first RF signals being transmitted by cooperative UAVs 405B, 405C, 405D, 405E, 405G are omitted in FIGS. 4B, 4C, and 4D for clarity. In the illustrated embodiment, cooperative UAVs 405F, 405H are too far from cooperative UAV 405A to receive and reflect the first RF signal from cooperative UAV 405A.

Returning now to FIG. 2, at step/operation 215, a processor (such as, but not limited to, the processing circuitry 105 of the cooperative UAV 100 described above in connection with FIG. 1) calculates the distance to each object (cooperative UAV or uncooperative UAV) off which the first RF signal reflected. In various embodiments, the processor calculates the distance using conventional radar techniques that are based on the time between the transmission of the first RF signal and the reception of the reflection.

Figure 4C:
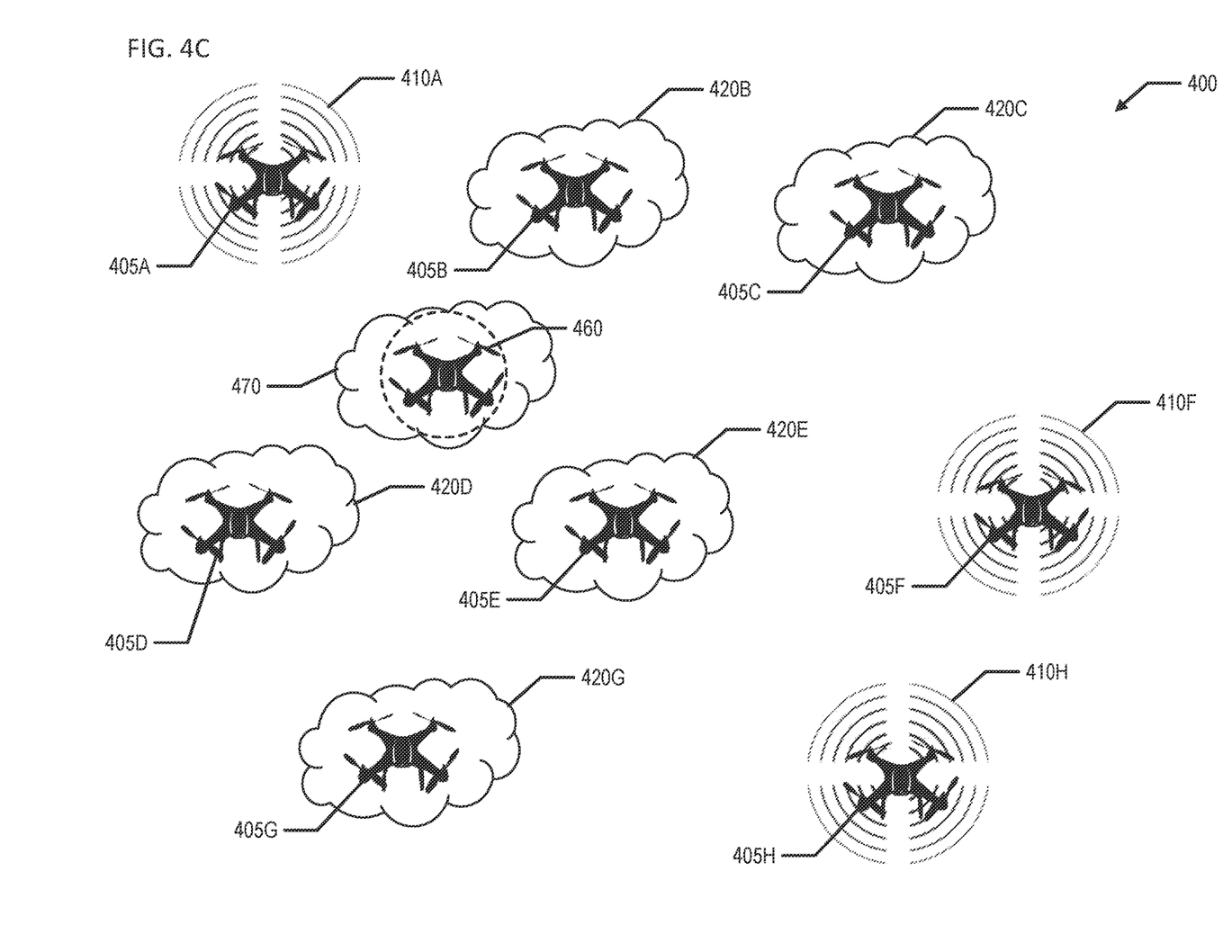

At step/operation 220, a processor (such as, but not limited to, the processing circuitry 105 of the cooperative UAV 100 described above in connection with FIG. 1) uses the calculated distances to create a plurality of point clouds. The point clouds, which may also be termed pseudo-images, are representations of the various distances from each respective cooperative UAV at which the first RF signal was reflected. Since the first RF signal will reflect off of many different parts of each other nearby UAV, there are many reflections off each other nearby UAV that make up each point cloud. Each of the point clouds will be roughly coincident with a respective other nearby UAV. FIG. 4C illustrates the point clouds 420B, 420C, 420D, 420E, 420G, and 470 created from the distances of the reflections of the first RF signal from UAV 405A reflecting off of, respectively, cooperative UAVs 405B, 405C, 405D, 405E, 405G, and uncooperative UAV 460. The first RF signals being transmitted by and being reflected by cooperative UAVs 405B, 405C, 405D, 405E, 405G are omitted in FIGS. 4C and 4D for clarity. Again, in the illustrated embodiment, cooperative UAVs 405F, 405H are too far from cooperative UAV 405A to receive and reflect the first RF signal from cooperative UAV 405A and therefore there is no point cloud coincident with cooperative UAVs 405F or 405H.

Returning now to FIG. 2, at step/operation 225, a processor (such as, but not limited to, the processing circuitry 105 of the cooperative UAV 100 described above in connection with FIG. 1, along with the receiver 135 and the antenna 140) receives first RF signals from each of one or more other cooperative UAVs in the swarm. Encoded on each of the received first RF signals are the unique ID code and the location of the respective cooperative UAV transmitting the respective first RF signal.

Figure 4D:
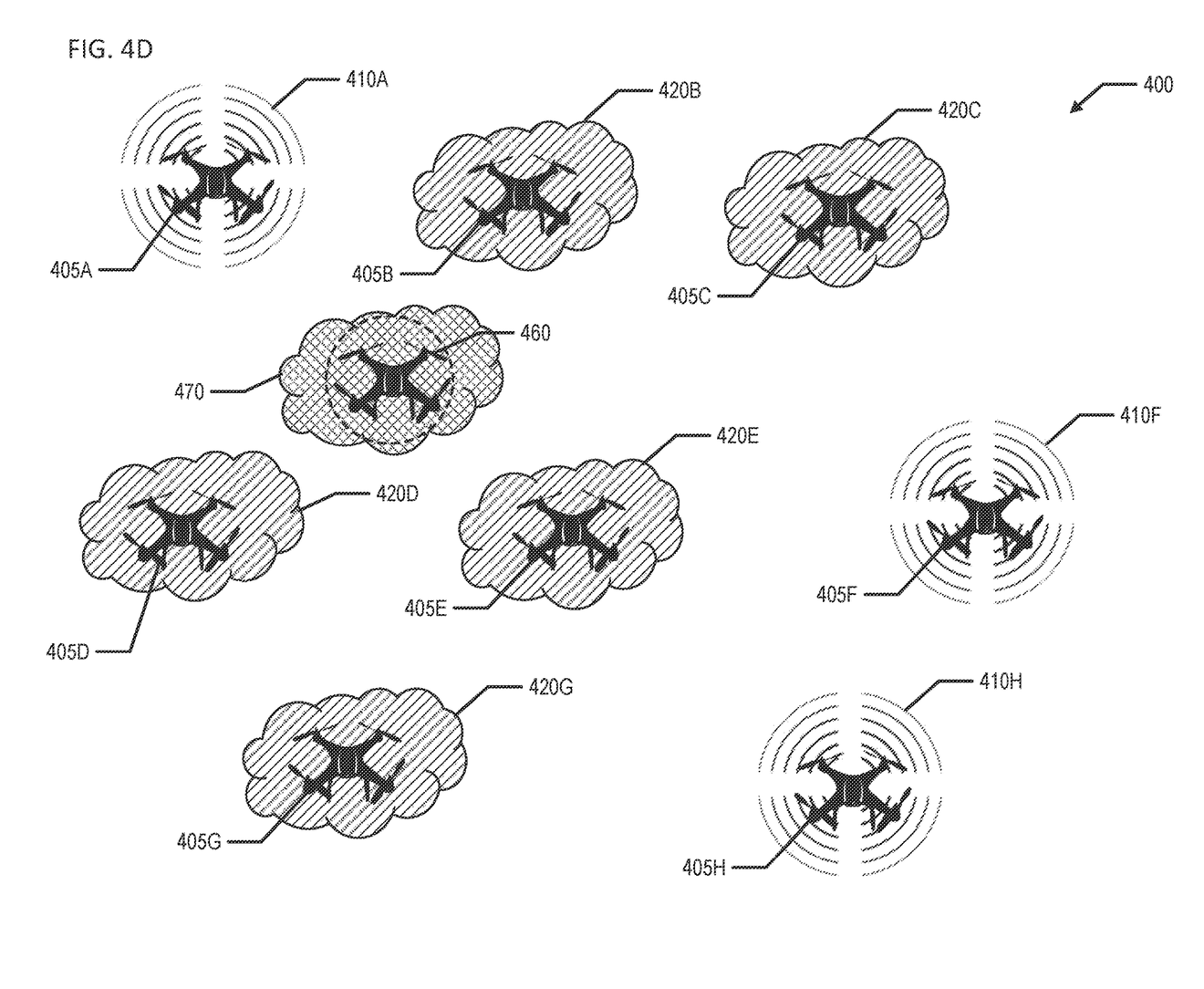

At step/operation 230, a processor (such as, but not limited to, the processing circuitry 105 of the cooperative UAV 100 described above in connection with FIG. 1) correlates the point clouds with the location information for the other cooperative UAVs received at step/operation 225, and thereby associates one or more of the point clouds with a corresponding cooperative UAV. FIG. 4D illustrates the point clouds 420B, 420C, 420D, 420E, and 420F created from the distances of the reflections of the first RF signal from UAV 405A reflecting off of, respectively, cooperative UAVs 405B, 405C, 405D, 405E, and 405F with hatching to indicate that point clouds 420B, 420C, 420D, 420E, and 420F have been associated with cooperative UAVs.

Returning now to FIG. 2, at step/operation 235, a processor (such as, but not limited to, the processing circuitry 105 of the cooperative UAV 100 described above in connection with FIG. 1) determines which of the point clouds are associated with one or more uncooperative UAVs. By having determined at step/operation 230 which of the point clouds are associated with cooperative UAVs, the processor can use a process of elimination to determine which of the point clouds are associated with uncooperative UAVs. FIG. 4D illustrates the point cloud 470 created from the distances of the reflections of the first RF signal from UAV 405A reflecting off of the uncooperative UAV 460 with cross-hatching to indicate that the point cloud 470 has been associated with an uncooperative UAV. By determining which point cloud is associated with an uncooperative UAV, the uncooperative UAVs approximate location is known.

Figure 4E:
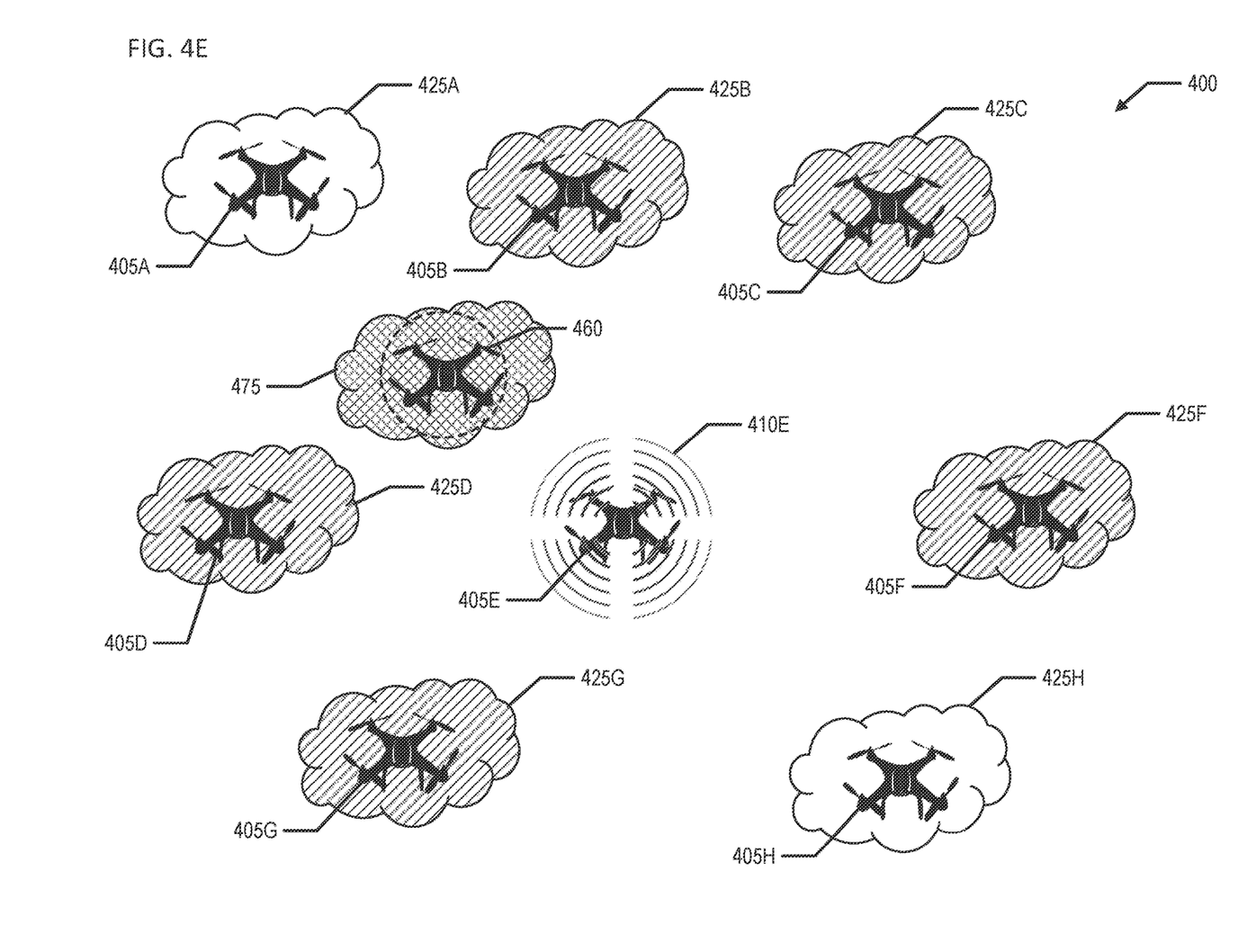

Returning now to FIG. 2, at step/operation 240, a processor (such as, but not limited to, the processing circuitry 105 of the cooperative UAV 100 described above in connection with FIG. 1, along with the transmitter 130 and the antenna 140) transmits the point cloud associations determined in steps/operations 235 and 235 to enable other cooperative UAVs in the swarm to use that information to further confirm point cloud/cooperative UAV correlations already made and/or to enable additional point cloud/cooperative UAV correlations. FIG. 4E illustrates the point cloud determinations made by cooperative UAV 405E. In FIG. 4E, cooperative UAV 405E has created point clouds 425A-D and 425F-H, has associated point clouds 425B, 425C, 425D, 425F, 425G, and 475 with, respectively, cooperative UAVs 405B, 405C, 405D, 405F, 405G and uncooperative UAV 460. Cooperative UAV 405A (and other cooperative UAVs) would receive these correlations from cooperative UAV 405E.

In various embodiments, the process 200 illustrated in FIG. 2 continuously repeats while the swarm of cooperative UAVs is flying over and/or near a protected area. In various embodiments, the process 200 illustrated in FIG. 2 continuously repeats at predetermined intervals.

Referring now to FIG. 3, the example synchronous or active mode method 300 starts at step/operation 305. At step/operation 305, a processor (such as, but not limited to, the processing circuitry 105 of the cooperative UAV 100 described above in connection with FIG. 1, along with the transmitter 130 and the antenna 140) transmits a first RF signal with a unique ID code encoded on the first RF signal. As described above, FIG. 4A illustrates each of the cooperative UAVs 405A-405H of the swarm 400 transmitting such a first RF signal 410A-410H, respectively, with respective ID codes.

Returning now to FIG. 3, at step/operation 310, a processor (such as, but not limited to, the processing circuitry 105 of the cooperative UAV 100 described above in connection with FIG. 1, along with the receiver 135 and the antenna 140) receives reflections of the first RF signal off one or more cooperative UAVs and one or more uncooperative UAVs. As described above, FIG. 4B illustrates the reflections 415B, 415C, 415D, 415E, 415G, 465 of the first RF signal from UAV 405A reflecting off of, respectively, cooperative UAVs 405B, 405C, 405D, 405E, 405G, and uncooperative UAV 460.

Returning now to FIG. 3, at step/operation 315, a processor (such as, but not limited to, the processing circuitry 105 of the cooperative UAV 100 described above in connection with FIG. 1) calculates the distance to each object (cooperative UAV or uncooperative UAV) off which the first RF signal reflected. In various embodiments, the processor calculates the distance using conventional radar techniques that are based on the time between the transmission of the first RF signal and the reception of the reflection.

At step/operation 320, a processor (such as, but not limited to, the processing circuitry 105 of the cooperative UAV 100 described above in connection with FIG. 1) uses the calculated distances to create a plurality of point clouds. As described above, FIG. 4C illustrates the point clouds 420B, 420C, 420D, 420E, 420G, and 470 created from the distances of the reflections of the first RF signal from UAV 405A reflecting off of, respectively, cooperative UAVs 405B, 405C, 405D, 405E, 405G, and uncooperative UAV 460.

Returning now to FIG. 3, at step/operation 325, a processor (such as, but not limited to, the processing circuitry 105 of the cooperative UAV 100 described above in connection with FIG. 1, along with the receiver 135 and the antenna 140) receives first RF signals from each of one or more other cooperative UAVs in the swarm. Encoded on each of the received first RF signals are the unique ID code of the respective cooperative UAV transmitting the respective first RF signal. In the synchronous/active mode, the first RF signal may be referred to as an interrogation signal and the UAVs receiving the signal may be referred to as transponders (using conventional transponder terminology). The transponder units algorithmically, positively detect the signal as a known-entity interrogation based on its modulated interrogation information.

At step/operation 330, a processor (such as, but not limited to, the processing circuitry 105 of the cooperative UAV 100 described above in connection with FIG. 1, along with the transmitter 130 and the antenna 140), in response to receiving one or more first RF signals from one or more other cooperative UAVs, transmits a second RF signal with a deterministic delay, in a similar fashion to a conventional transponder operation. For purposes of this description, in some embodiments the term "deterministic delay" refers to a measured delay which is a combination of the turnaround and deterministic processing delays.

At step/operation 335, a processor (such as, but not limited to, the processing circuitry 105 of the cooperative UAV 100 described above in connection with FIG. 1, along with the receiver 135 and the antenna 140) receives one or more second RF signals from one or more other cooperative UAVs.

At step/operation 340, a processor (such as, but not limited to, the processing circuitry 105 of the cooperative UAV 100 described above in connection with FIG. 1) uses the received second RF signals with deterministic delays to determine a range to the one or more other cooperative UAVs from which second RF signals were received, in a similar fashion to a conventional transponder operation.

At step/operation 345, a processor (such as, but not limited to, the processing circuitry 105 of the cooperative UAV 100 described above in connection with FIG. 1) correlates the point clouds with the range information for the other cooperative UAVs determined at step/operation 340, and thereby associates one or more of the point clouds with a corresponding cooperative UAV. As described above, FIG. 4D illustrates the point clouds 420B, 420C, 420D, 420E, and 420F created from the distances of the reflections of the first RF signal from UAV 405A reflecting off of, respectively, cooperative UAVs 405B, 405C, 405D, 405E, and 405F with hatching to indicate that point clouds 420B, 420C, 420D, 420E, and 420F have been associated with cooperative UAVs.

Returning now to FIG. 3, at step/operation 350, a processor (such as, but not limited to, the processing circuitry 105 of the cooperative UAV 100 described above in connection with FIG. 1) determines which of the point clouds are associated with one or more uncooperative UAVs. By having determined at step/operation 345 which of the point clouds are associated with cooperative UAVs, the processor can use a process of elimination to determine which of the point clouds are associated with uncooperative UAVs. As described above, FIG. 4D illustrates the point cloud 470 created from the distances of the reflections of the first RF signal from UAV 405A reflecting off of the uncooperative UAV 460 with cross-hatching to indicate that the point cloud 470 has been associated with an uncooperative UAV. By determining which point cloud is associated with an uncooperative UAV, the uncooperative UAVs approximate location is known.

Returning now to FIG. 3, at step/operation 355, a processor (such as, but not limited to, the processing circuitry 105 of the cooperative UAV 100 described above in connection with FIG. 1, along with the transmitter 130 and the antenna 140) transmits the point cloud associations determined in steps/operations 345 and 350 to enable other cooperative UAVs to use that information to further confirm point cloud/cooperative UAV correlations already made and/or to enable additional point cloud/cooperative UAV correlations. As described above, FIG. 4E illustrates the point cloud determinations made by cooperative UAV 405E that may be received and used by other cooperative UAVs, such as cooperative UAV 405A.

In various embodiments, the process 300 illustrated in FIG. 3 continuously repeats while the swarm of cooperative UAVs is flying over and/or near a protected area. In various embodiments, the process 300 illustrated in FIG. 3 continuously repeats at predetermined intervals.

Although not illustrated in FIG. 2 or FIG. 3, in various embodiments the cooperative UAVs transmit their determinations of the location(s) of uncooperative UAV(s) to a central communications server or the like. In various embodiments such a central communications server will track the uncooperative UAV(s), determine if any actions need to be taken against the uncooperative UAV(s) (for example, instruct one or more of the cooperative UAVs to collide into the uncooperative UAV), and take such actions if needed.

Operations and/or functions of the present invention have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this specification contains many specific embodiment and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results.

Thus, while particular embodiments of the subject matter have been described, other embodiments are within the scope of the following claims.

What is claimed is:

1. A system of detecting an uncooperative uncrewed vehicle within a plurality of cooperative uncrewed vehicles, the system comprising:
   a plurality of cooperative uncrewed vehicles, each vehicle comprising one or more radio frequency (RF) transmitters, one or more RF receivers, and a processor;
   wherein each of the plurality of cooperative uncrewed vehicles is configured to:
   transmit, via at least one of the one or more RF transmitters, a respective first RF signal containing a unique identification (ID) code;
   receive, via at least one of the one or more RF receivers, a plurality of reflections of the first RF signal reflected off one or more others of the plurality of cooperative uncrewed vehicles and reflected off at least one uncooperative uncrewed vehicle;
   calculate, via the processor, for at least some of the plurality of reflections, a distance at which the first RF signal was reflected based on an amount of time between the transmission of the first RF signal and the receiving of each of the plurality of reflections;
   create, via the processor, one or more point clouds, each point cloud corresponding to the reflections of the first RF signal reflected off one of the others of the plurality of cooperative uncrewed vehicles or off the at least one uncooperative uncrewed vehicle;
   receive, via at least one of the one or more RF receivers, (i) respective first RF signals from one or more others of the plurality of cooperative uncrewed vehicles, each of the respective first RF signals containing a unique ID code and a location of a respective one of the one or more others of the plurality of cooperative uncrewed vehicles, or (ii) respective second RF signals from one or more others of the plurality of cooperative uncrewed vehicles, each of the respective second RF signals sent by a respective one of the one or more others of the plurality of cooperative uncrewed vehicles in response to receiving the first RF signal and each of the respective second RF signals having a deterministic delay;

correlate, via the processor, the created point clouds with (i) the received respective first RF signals from each of the one or more others of the plurality of cooperative uncrewed vehicles or (ii) the received respective second RF signals from each of one or more others of the plurality of cooperative uncrewed vehicles to determine which of the one or more point clouds is associated with which one of the one or more others of the plurality of cooperative uncrewed vehicles; and determine, via the processor, which of the one or more point clouds is not associated with one of the one or more others of the plurality of cooperative uncrewed vehicles and is therefore associated with one of the at least one uncooperative uncrewed vehicle.

2. The system of claim 1, wherein the first RF signal transmitted by each of the plurality of cooperative uncrewed vehicles contains a location of the respective one of the plurality of cooperative uncrewed vehicles.

3. The system of claim 1, wherein each of the plurality of cooperative uncrewed vehicles is further configured to, via the processor, use the delay of the received respective second RF signals from each of one or more others of the plurality of cooperative uncrewed vehicles to determine a range to each of one or more others of the plurality of cooperative uncrewed vehicles.

4. The system of claim 1, wherein each of the plurality of cooperative uncrewed vehicles is further configured to transmit, via at least one of the one or more RF transmitters, its determination of which of the one or more point clouds is associated with which one of the one or more others of the plurality of cooperative uncrewed vehicles.

5. The system of claim 1, wherein each of the plurality of cooperative uncrewed vehicles is further configured to receive, from one or more others of the plurality of cooperative uncrewed vehicles via at least one of the one or more RF receivers, one or more determinations of which of the one or more point clouds is associated with which one of the one or more others of the plurality of cooperative uncrewed vehicles.

6. The system of claim 1, wherein each of the plurality of cooperative uncrewed vehicles and the at least one uncooperative uncrewed vehicle comprise uncrewed aerial vehicles.

7. An uncrewed vehicle for detecting an uncooperative uncrewed vehicle within a plurality of cooperative uncrewed vehicles, the uncrewed vehicle comprising:

a radio frequency (RF) transmitter configured to transmit a first RF signal containing a unique identification (ID) code;

one or more RF receivers configured to receive a plurality of reflections of the first RF signal reflected off one or more others of the plurality of cooperative uncrewed vehicles and reflected off at least one uncooperative uncrewed vehicle; and a processor configured to calculate, for at least some of the plurality of reflections, a distance at which the first RF signal was reflected based on an amount of time between the transmission of the first RF signal and the receiving of each of the plurality of reflections and configured to create one or more point clouds, each point cloud corresponding to the reflections of the first RF signal reflected off one of the others of the plurality of cooperative uncrewed vehicles or off the at least one uncooperative uncrewed vehicle;

wherein at least one of the one or more RF receivers is adapted to receive (i) respective first RF signals from one or more others of the plurality of cooperative uncrewed vehicles, each of the respective first RF signals containing a location of a respective one of the one or more others of the plurality of cooperative uncrewed vehicles, or (ii) respective second RF signals from one or more others of the plurality of cooperative uncrewed vehicles, each of the respective second RF signals sent by a respective one of the one or more others of the plurality of cooperative uncrewed vehicles in response to receiving the first RF signal and each of the respective second RF signals having a deterministic delay;

wherein the processor is configured to correlate the created point clouds with (i) the received respective first RF signals from each of the one or more others of the plurality of cooperative uncrewed vehicles or (ii) the received respective second RF signals from each of one or more others of the plurality of cooperative uncrewed vehicles to determine which of the one or more point clouds is associated with which one of the one or more others of the plurality of cooperative uncrewed vehicles; and wherein the processor is configured to determine which of the one or more point clouds is not associated with one of the one or more others of the plurality of cooperative uncrewed vehicles and is therefore associated with one of the at least one uncooperative uncrewed vehicle.

8. The uncrewed vehicle of claim 7, wherein the first RF signal contains a location of the uncrewed vehicle.

9. The uncrewed vehicle of claim 7, wherein the processor is further configured to use the delay of the received respective second RF signals from each of one or more others of the plurality of cooperative uncrewed vehicles to determine a range to each of one or more others of the plurality of cooperative uncrewed vehicles.

10. The uncrewed vehicle of claim 7, wherein at least one of the one or more RF transmitter is further configured to transmit the determination of which of the one or more point clouds is associated with which one of the one or more others of the plurality of cooperative uncrewed vehicles.

11. The uncrewed vehicle of claim 10, wherein at least one of the one or more RF receivers is adapted to receive, from one or more others of the plurality of cooperative uncrewed vehicles, one or more determinations of which of the one or more point clouds is associated with which one of the one or more others of the plurality of cooperative uncrewed vehicles.

12. The uncrewed vehicle of claim 7, wherein the uncrewed vehicle comprises an uncrewed aerial vehicle.

13. A method of detecting an uncooperative uncrewed vehicle within a plurality of cooperative uncrewed vehicles, the method comprising:

transmitting, by each of a plurality of cooperative uncrewed vehicles via a respective one or more radio frequency (RF) transmitters, a respective first RF signal containing a unique identification (ID) code;

receiving, by each of the plurality of cooperative uncrewed vehicles via a respective one or more RF receivers, a plurality of reflections of the first RF signal reflected off one or more others of the plurality of cooperative uncrewed vehicles and reflected off at least one uncooperative uncrewed vehicle;

calculating, by each of the plurality of cooperative uncrewed vehicles via a respective processor for at least some of the plurality of reflections, a distance at which the first RF signal was reflected based on an amount of time between the transmission of the first RF signal and the receiving of each of the plurality of reflections;

creating, by each of the plurality of cooperative uncrewed vehicles via its respective processor, one or more point clouds, each point cloud corresponding to the reflections of the first RF signal reflected off one of the others of the plurality of cooperative uncrewed vehicles or off the at least one uncooperative uncrewed vehicle;

receiving, by each of the plurality of cooperative uncrewed vehicles via at least one of its respective one or more RF receivers, (i) respective first RF signals from one or more others of the plurality of cooperative uncrewed vehicles, each of the respective first RF signals containing a unique ID code and a location of a respective one of the one or more others of the plurality of cooperative uncrewed vehicles, or (ii) respective second RF signals from one or more others of the plurality of cooperative uncrewed vehicles, each of the respective second RF signals sent by a respective one of the one or more others of the plurality of cooperative uncrewed vehicles in response to receiving the first RF signal and each of the respective second RF signals having a deterministic delay;

correlating, by each of the plurality of cooperative uncrewed vehicles via its respective processor, the created point clouds with (i) the received respective first RF signals from each of the one or more others of the plurality of cooperative uncrewed vehicles or (ii) the received respective second RF signals from each of one or more others of the plurality of cooperative uncrewed vehicles to determine which of the one or more point clouds is associated with which one of the one or more others of the plurality of cooperative uncrewed vehicles; and determining, by each of the plurality of cooperative uncrewed vehicles via its respective processor, which of the one or more point clouds is not associated with one of the one or more others of the plurality of cooperative uncrewed vehicles and is therefore associated with one of the at least one uncooperative uncrewed vehicle.

14. The method of claim 13, wherein the first RF signal transmitted by each of the plurality of cooperative uncrewed vehicles contains a location of the respective one of the plurality of cooperative uncrewed vehicles.

15. The method of claim 13, wherein the method further comprises determining, by each of the plurality of cooperative uncrewed vehicles via its respective processor using the delay of the received respective second RF signals from each of one or more others of the plurality of cooperative uncrewed vehicles, a range to each of one or more others of the plurality of cooperative uncrewed vehicles.

16. The method of claim 13, wherein the method further comprises transmitting, by each of the plurality of cooperative uncrewed vehicles via its respective one or more RF transmitters, its respective determination of which of the one or more point clouds is associated with which one of the one or more others of the plurality of cooperative uncrewed vehicles.

17. The method of claim 16, wherein the method further comprises receiving, by each of the plurality of cooperative uncrewed vehicles via at least one of its one or more respective RF receivers from one or more others of the plurality of cooperative uncrewed vehicles, one or more determinations of which of the one or more point clouds is associated with which one of the one or more others of the plurality of cooperative uncrewed vehicles.

18. The method of claim 13, wherein each of the plurality of cooperative uncrewed vehicles and the at least one uncooperative uncrewed vehicle comprise uncrewed aerial vehicles.

* * * * *